United States Patent
Hayashi et al.

(10) Patent No.: US 12,014,539 B2
(45) Date of Patent: Jun. 18, 2024

(54) CONTROL PROCESSING DEVICE

(71) Applicant: HONDA MOTOR CO., LTD., Tokyo (JP)

(72) Inventors: Sunao Hayashi, Saitama (JP); Minami Asatani, Saitama (JP); Itoshi Naramura, Saitama (JP); Takahiro Kuroki, Saitama (JP); Satoki Matsumoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1561 days.

(21) Appl. No.: 16/245,557

(22) Filed: Jan. 11, 2019

(65) Prior Publication Data
US 2019/0243656 A1 Aug. 8, 2019

(30) Foreign Application Priority Data
Feb. 2, 2018 (JP) .................................. 2018-017471

(51) Int. Cl.
| | |
|---|---|
| G06V 20/20 | (2022.01) |
| B25J 9/00 | (2006.01) |
| G05B 19/042 | (2006.01) |
| G06F 1/12 | (2006.01) |
| G06V 20/10 | (2022.01) |
| G06V 20/64 | (2022.01) |

(52) U.S. Cl.
CPC ............... *G06V 20/20* (2022.01); *G06F 1/12* (2013.01); *G06V 20/10* (2022.01); *G06V 20/64* (2022.01); *B25J 9/00* (2013.01)

(58) Field of Classification Search
CPC ............ G06F 1/12; G05B 19/042; B25J 9/00
See application file for complete search history.

(56) References Cited

U.S. PATENT DOCUMENTS

| | | | |
|---|---|---|---|
| 2005/0140321 A1 | 6/2005 | Wojciak, Jr. | |
| 2009/0147899 A1* | 6/2009 | Arviv ........................ | H03L 7/00 375/359 |
| 2014/0245057 A1* | 8/2014 | Wroblewski ........ | G06F 11/1683 713/375 |

(Continued)

FOREIGN PATENT DOCUMENTS

| | | |
|---|---|---|
| JP | H09-9197 | 1/1997 |
| JP | 2002-116245 | 4/2002 |
| JP | 3385321 | 12/2002 |

(Continued)

OTHER PUBLICATIONS

Japanese Office Action dated Jul. 16, 2019, 8 pages.

*Primary Examiner* — Jaweed A Abbaszadeh
*Assistant Examiner* — Gayathri Sampath
(74) *Attorney, Agent, or Firm* — Rankin, Hill & Clark LLP

(57) ABSTRACT

A second processing unit (40), which receives a first count value N1 transmitted in a predetermined reference cycle Δt1 from the first processing unit (30), has a second counter (41) which outputs a second count value N2 in a cycle Δt2 shorter than the reference cycle Δt1. The second count value N2 is initialized in response to reception of the first count value N1. The second processing unit (40) associates time determined according to the first count value N1 and the second count value N2 with generated or acquired second data (external measurement data).

7 Claims, 2 Drawing Sheets

(56) References Cited

U.S. PATENT DOCUMENTS

2018/0182440 A1\* 6/2018 Khare .................... G11C 7/222
2019/0196563 A1\* 6/2019 Lai .......................... G06F 1/324

FOREIGN PATENT DOCUMENTS

| JP | 2004-029037 | 1/2004 |
| JP | 2004-213197 | 7/2004 |
| JP | 4082211 | 2/2008 |
| JP | 2009-285752 | 12/2009 |

\* cited by examiner

CONTROL PROCESSING DEVICE

BACKGROUND OF THE INVENTION

1. Field of the Invention

The present invention relates to a control processing device configured to have two processing units so as to be able to transmit a count value indicating a reference time from one processing unit to the other processing unit while performing control processing synchronized between the two processing units.

2. Description of the Related Art

There has been conventionally known, for example, a mobile robot provided with a control processing device configured to perform the motion control of the mobile robot while recognizing an external state such as an arrangement state or the like of an object present around the mobile robot by using an external sensor of a stereo camera or the like mounted on the mobile robot (for example, refer to Patent Literature 1).

This type of control processing device often has difficulty in being configured as a single processing unit due to constraints or the like in layout of the control processing device. In such a case, the control processing device is composed of a plurality of processing units, these processing units are arranged in separate locations, and the processing units perform communications therebetween via transmission cables or the like.

For example, in the mobile robot as disclosed in Patent Literature 1, the control processing device is often configured in such a way as to have a processing unit which performs control processing related to measuring an external state and a processing unit which performs control processing related to driving joints of the mobile robot and monitoring an actual motional state of the mobile robot or the like, the processing units being arranged in locations separate from each other so as to perform communication therebetween.

Furthermore, in the control processing device having a plurality of processing units as described above, generally one processing unit transmits a count value indicating a reference time to each of other processing units while sequentially updating the count value in a predetermined reference cycle in order to achieve synchronization of control processing (data generation or acquisition or the like) between the plurality of processing units, and each of the processing units performs control processing in synchronization with the updating of the count value.

In addition, for example, Patent Literature 2 discloses a processing technique related to a microcomputer and Patent Literature 3 discloses a processing technique related to a receiver of a global positioning system.

CITATION LIST

Patent Literature

Patent Literature 1: Japanese Patent Application Laid-Open No. 2009-285752
Patent Literature 2: Japanese Patent No. 4082211
Patent Literature 3: Japanese Patent No. 3385321

SUMMARY OF THE INVENTION

In a control processing device having a processing unit which transmits a count value indicating a reference time (hereinafter, sometimes referred to as "first processing unit") and a processing unit which receives the count value (hereinafter, sometimes referred to as "second processing unit") as described above, the updating cycle of the transmitted count value cannot be made too short due to constraints caused by a transmission cable between the first processing unit and the second processing unit, communication standards, or the like in many cases.

On the other hand, the second processing unit, which receives the aforementioned count value, preferably is able to perform the control processing with a higher time resolution to increase the data accuracy or the like obtained by the control processing in many cases.

For example, in the case where the control processing device is configured to have a main processing unit defined as the above first processing unit, which performs the control processing related to driving joints of the mobile robot and monitoring an actual motional state of the mobile robot or the like, and a processing unit defined as the second processing unit, which performs the control processing related to measuring an external state by using an external sensor of a stereo camera or the like, it is preferable to increase the time resolution of the control processing for measuring the external state performed by the second processing unit in many cases in order to increase the accuracy of the measurement data of the external state.

Conventionally, however, the control processing of the second processing unit has been performed with the time resolution defined by the updating cycle of the count value transmitted from the first processing unit. Accordingly, in the case where the updating cycle of the count value transmitted from the first processing unit cannot be made too short, the time resolution of the control processing by the second processing unit decreases. Consequently, it tends to be difficult to increase the accuracy of the data obtained by the control processing of the second processing unit (for example, data indicating the measurement result of the external state).

The present invention has been made in view of the above background. Therefore, it is an object of the present invention to provide a control processing device capable of performing the processing of the second processing unit with a time resolution higher than the updating cycle of the count value transmitted so as to be sequentially updated in a predetermined reference cycle from the first processing unit to the second processing unit while securing the temporal consistency between processing of the first processing unit and processing of the second processing unit.

To achieve the above object, a control processing device of the present invention includes: a first processing unit having a first counter which outputs a first count value indicating time for each predetermined reference cycle so as to sequentially update the first count value in the reference cycle and which has a function of performing processing of generating or acquiring first data, with which each first count value output from the first counter is associated, and processing of sequentially transmitting the first count value in the reference cycle; and a second processing unit which is configured to be able to receive the first count value transmitted from the first processing unit and has a second counter which outputs a second count value indicating time for each predetermined cycle shorter than the reference cycle so as to sequentially update the second count value in the predetermined cycle, and which has a function of performing processing of regularly initializing the second count value output from the second counter in response to reception of the first count value and processing of generating or acquiring second data related to the first data with a time resolution higher than a time resolution defined by the reference cycle, wherein the second processing unit is configured to associate time obtained by combining time indicated by the first count value received from the first processing unit with time indicated by the second count value output from the second counter with the second data, when generating or acquiring the second data (First aspect of the invention).

According to the above first aspect of the invention, the second processing unit includes the second counter which sequentially outputs the second count value indicating the time for each predetermined cycle shorter than the reference cycle, and the second count value output from the second counter is regularly initialized in response to the reception of the first counter. In addition, the second data generated or acquired by the second processing unit is associated with the time obtained by combining the time indicated by the first count value received from the first processing unit with the time indicated by the second count value output from the second counter.

Thereby, the second processing unit is able to secure a temporal consistency with the processing of generating or acquiring the first data by the first processing unit. Additionally, the second processing unit is able to perform the processing of generating or acquiring the second data with a time resolution higher than the time resolution defined by the reference cycle.

Therefore, according to the first aspect of the invention, the second processing unit is able to perform the processing with a time resolution higher than the updating cycle of the count value transmitted from the first processing unit to the second processing unit so as to be sequentially updated in the predetermined reference cycle while securing a temporal consistency between the processing of the first processing unit and the processing of the second processing unit.

More specifically, the above first aspect of the invention may permits a manner in which the second processing unit is configured to associate with the second data, a time obtained by adding a duration, which is indicated by an amount of change in the second count value output from the second counter from the time indicated by the latest first count value to the time when the second data is generated or acquired, to the time indicated by the latest first count value received from the first processing unit before the time when the second data is generated or acquired, as the combined time (Second aspect of the invention).

This enables the time with a time resolution higher than the reference cycle to be appropriately associated with the second data.

In the above first or second aspect of the invention, preferably the second processing unit is configured to initialize the second count value output from the second counter for each reception of the first count value (Third aspect of the invention).

According thereto, a difference in synchrony between the first count value and the second count value can be reduced as much as possible.

In the first to third aspects of the invention, preferably the first processing unit is configured to sequentially perform processing of transmitting the first data, with which the first count value is associated, to the second processing unit in the reference cycle, and the second processing unit further has a function of performing processing of estimating a value of the first data at the time associated with the second data, which has been generated or acquired, by interpolation processing from a time series of the first data received from the first processing unit (Fourth aspect of the invention).

According thereto, when generating or acquiring the second data, the second processing unit is able to appropriately estimate the value of the first data at the time associated with the second data by the interpolation processing. Therefore, the second processing unit is able to associate the second data with the value of the first data obtained when generating or acquiring the second data.

The above fourth aspect of the invention may adopt, for example, an embodiment as described below. Specifically, the first processing unit is configured to acquire detection data related to a motional state of a predetermined region of a moving body, as the first data, and to transmit the first data to the second processing unit, and the second processing unit is configured to acquire the detection data of an object, which is present around the moving body, output from an external sensor mounted on the predetermined region of the moving body so as to detect the object, as the second data, and to generate third data indicating a relative arrangement state to the moving body of the object detected by the external sensor by using the value of the second data and a value estimated by the interpolation processing as the value of the first data at the time associated with the second data. (Fifth aspect of the invention).

According thereto, the detection data of the object can be acquired in a short cycle with a time resolution higher than that of the reference cycle. In addition, the motional state of the predetermined region of the moving body at the time when the detection data of the object is acquired can be appropriately estimated. This enables accurate generation of data indicating the relative arrangement state of the object detected by the external sensor to the moving body.

In the above first to fifth aspects of the invention, preferably, in the case of an occurrence of an abnormal state in which the first count value transmitted from the first processing unit cannot be normally received, the second processing unit is configured to estimate the time associated with the second data generated or acquired after the occurrence of the abnormal state, based on the second count value output from the second counter and to associate the estimated time with the second data (Sixth aspect of the invention).

According thereto, even in the case of an occurrence of the abnormal state, the second processing unit is able to associate the time with the time resolution higher than the reference time with the second data to be generated or acquired.

More specifically, the above sixth aspect of the invention may adopt an embodiment, in which the second processing unit is configured to determine a time obtained by adding a duration, which is indicated by an amount of change in the second count value output from the second counter from the time indicated by the first count value received last before the occurrence of the abnormal state until the time when the second data is generated or acquired after the occurrence of the abnormal state, to the time indicated by the first count value received last before the occurrence of the abnormal state, as the time associated with the second data (Seventh aspect of the invention).

According thereto, in the case of occurrence of the abnormal state, time associated with the second data can be appropriately determined.

DESCRIPTION OF THE PREFERRED EMBODIMENTS

Figure 1:
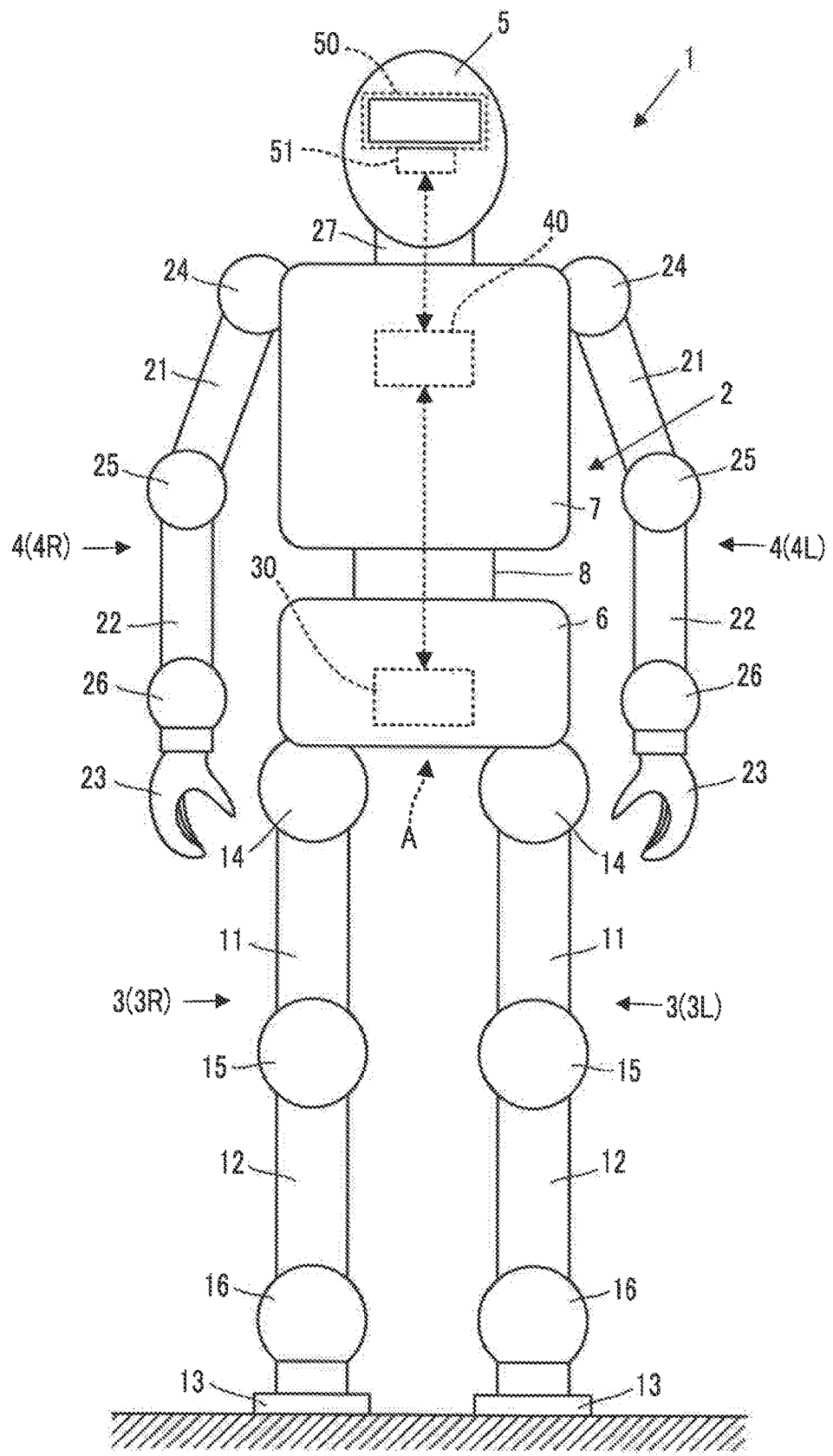
FIG. 1 is a diagram illustrating a robot (moving body) to which an embodiment of a control processing device according to the present invention is applied.
Figure 2:
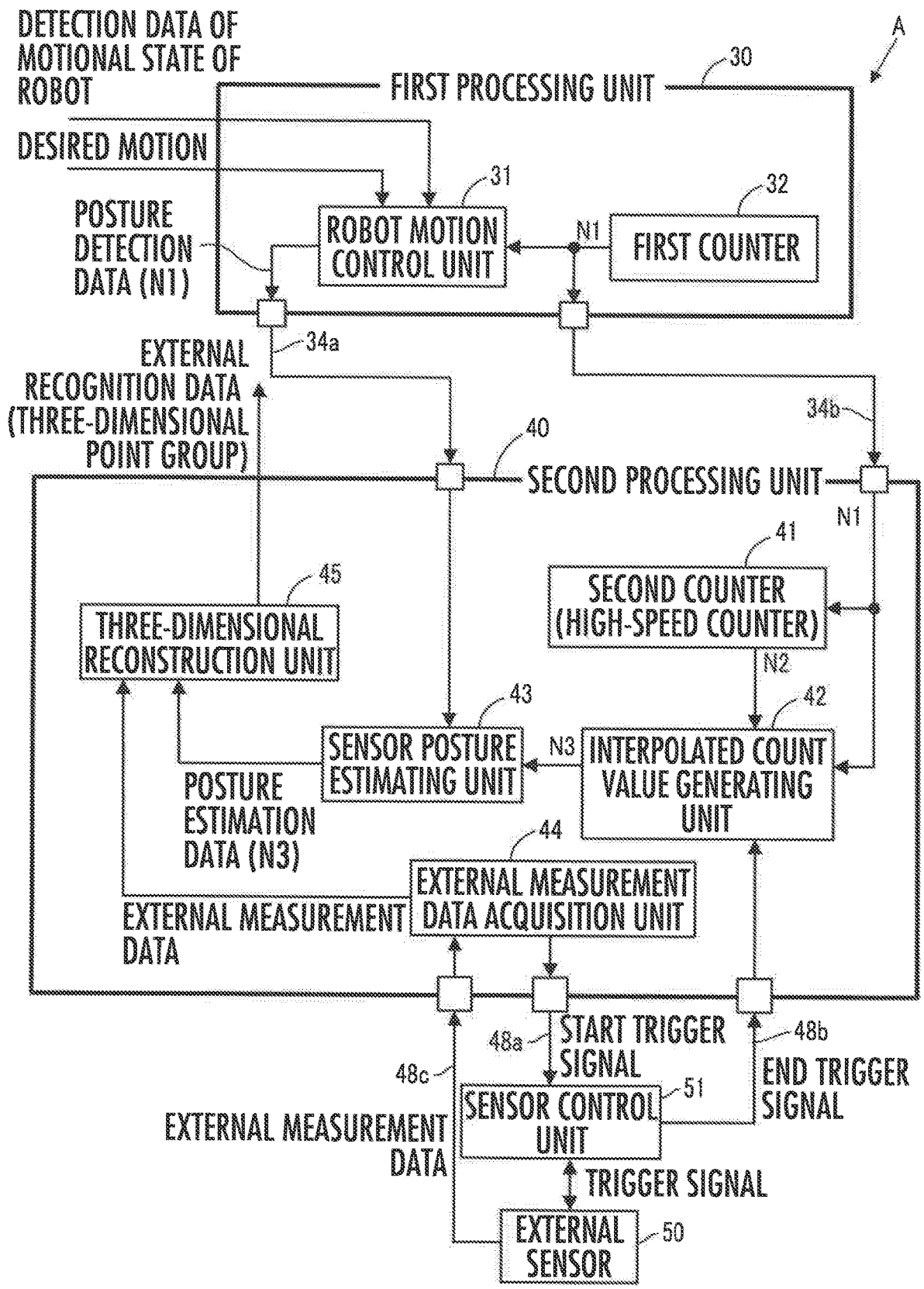
FIG. 2 is a block diagram illustrating the configuration of the control processing device of the embodiment.

An embodiment of the present invention will be described with reference to FIGS. 1 and 2. The control processing device A according to this embodiment is mounted on, for example, a robot 1 as illustrated in FIG. 1. The robot 1 is an example of a moving body. The robot 1 in this example is a humanoid legged mobile robot, which includes a base body 2 corresponding to a body, a pair of right and left (two) leg links 3 and 3 and a pair of right and left (two) arm links 4 and 4 as a plurality of (four in this embodiment) movable links extended from the base body 2, and a head 5.

In this embodiment, the base body 2 includes a lower base body 6, which forms the bottom of the base body 2, an upper base body 7, which forms the upper part of the base body 2, and a joint mechanism 8, which couples the lower base body 6 and the upper base body 7 to each other. In addition, the head 5 is attached to the top end of the base body 2 (the top end of the upper base body 7) through a neck joint mechanism 27.

Each leg link 3 is extended from the bottom of the base body 2 (lower base body 6) and composed of elemental links corresponding to a thigh 11, a crus 12, and a foot 13 coupled to each other through a hip joint mechanism 14, a knee joint mechanism 15, and an ankle joint mechanism 16 starting from the base body 2 side.

Each arm link 4 is extended from the upper part of the base body 2 (upper base body 7) and composed of elemental links corresponding to an upper arm 21, a forearm 22, and a hand 23 coupled to each other through a shoulder joint mechanism 24, an elbow joint mechanism 25, and a wrist joint mechanism 26 starting from the base body 2 side.

Although a detailed illustration is omitted, each of the above joint mechanisms 8, 14, 15, 16, 24, 25, and 26 is formed of one or more joints (rotary joints) having, for example, a freedom degree of rotation about one axis. Additionally, each of the joints is driven by an actuator such as an electric motor, by which the movement of the robot 1 is performed. Note that each of the joint mechanisms 8, 14, 15, 16, 24, 25, and 26 is not limited to a rotary joint and may include a direct-acting joint.

The robot 1 having the above configuration is equipped with a first processing unit 30 and a second processing unit 40 as constituent elements of the control processing device A of this embodiment, an external sensor 50 for use in measuring an external state of the surroundings of the robot 1, and a sensor control unit 51 which performs control processing of the external sensor 50 located in arbitrary proper places, respectively.

In the robot 1 in the illustration, the first processing unit 30 is mounted on, for example, the lower base body 6, the second processing unit 40 is mounted on, for example, the upper base body 7, and the external sensor 50 and the sensor control unit 51 are mounted on, for example, the head 5. Incidentally, the head 5 corresponds to a predetermined region of a moving body in the present invention.

In this embodiment, the external sensor 50 is more specifically a sensor for use in detecting objects (the ground, a floor, an installation object, a structure, or the like) present around the robot 1 and is formed of, for example, a stereo camera, a laser range finder (LRF), or the like. The external sensor 50 is configured to be able to measure a distance to each of a plurality of measurement points of an object present in the area on the front side of the external sensor 50 and to output the measurement data (hereinafter, referred to as "external measurement data"). In this embodiment, the external measurement data corresponds to detection data of an object in the present invention.

Each of the first processing unit 30, the second processing unit 40, and the sensor control unit 51 is formed of an electronic circuit unit including a microcomputer or a processor, a memory, an interface circuit, and the like. In addition, as illustrated in FIG. 2, the first processing unit 30 is connected to the second processing unit 40 through transmission cables 34a and 34b so as to be able to communicate with the second processing unit 40. Furthermore, the second processing unit 40 is connected to the sensor control unit 51 through transmission cables 48a and 48b so as to be able to communicate with the sensor control unit 51 and is connected to the external sensor 50 through a transmission cable 48c so as to be able to receive external measurement data from the external sensor 50.

Hereinafter, the configuration and operation of the control processing device A of this embodiment will be described in more detail. First, the first processing unit 30 includes a robot motion control unit 31, which performs a motion control or the like of the robot 1, and a first counter 32, which sequentially updates and outputs a first count value N1 representing the time in each predetermined reference cycle (more specifically, a first count value N1 representing an elapsed time from an arbitrary initial time in each predetermined reference cycle described above), as functions implemented by one or both of installed hardware configuration and a program (software configuration).

The first counter 32 sequentially updates the first count value N1 in such a way as to increase the first count value N1 in a predetermined reference cycle $\Delta t1$ (constant cycle) defined by a clock signal generated by an oscillator or the like, not illustrated, which is included in the first processing unit 30. Then, the first count value N1 output from the first counter 32 is input to the robot motion control unit 31 and transmitted from the first processing unit 30 to the second processing unit 40 through the transmission cable 34b.

The robot motion control unit 31 sequentially performs control processing for the motion control of the robot 1 in a cycle synchronized with the updating of the first count value N1 (=reference cycle $\Delta t1$), which is input from the first counter 32.

In this case, the robot motion control unit 31 receives an input of detection data indicating an actual motional state of the robot 1 such as detection data of a displacement amount (a rotation angle or the like) of each joint of the robot 1 or detection data of a posture (an inclination angle or the like) of the lower base body 6 (or the upper base body 7) of the robot 1 from a sensor or the like not illustrated. Moreover, the robot motion control unit 31 receives an input of a desired motion of the robot 1 from a higher-order control device or an external server or the like not illustrated.

Furthermore, the robot motion control unit 31 sequentially determines a target value of the displacement amount of each joint of the robot 1 so as to implement the input desired motion. In addition, the robot motion control unit 31 drives each joint through an actuator of the electric motor or the like in order to cause the actual displacement amount of each joint to follow the target value.

Moreover, the robot motion control unit 31 sequentially outputs data (hereinafter, referred to as "posture detection data" (N1)) obtained by adding the first count value N1 indicating the corresponding time to the posture detection data indicating the detection value of the posture of the mounting portion (head 5) of the external sensor 50 at the time corresponding to each of the first count value N1 input from the first counter 32 in the reference cycle Δt1 (=an updating cycle of the first count value N1), in parallel with performing the motion control of the robot 1 as described above.

Incidentally, the aforementioned posture detection data (N1) is more specifically, for example, detection data capable of identifying a relative position and orientation of the mounting portion (head 5) of the external sensor 50 at the time corresponding to the first count value N1 relative to the reference region (for example, the lower base body 6) of the robot 1. The posture detection data (N1) may be, for example, detection data indicating the position and orientation of the mounting portion (head 5) of the external sensor 50, viewed in the robot coordinate system set in the reference region of the robot 1, detection data defining the position and orientation (for example, detection data of a displacement amount of each joint present between the reference region of the robot 1 and the mounting portion (head 5) of the external sensor 50), or the like.

Then, the posture detection data (N1) output from the robot motion control unit 31 is sequentially transmitted from the first processing unit 30 to the second processing unit 40 through the transmission cable 34*a*. In this embodiment, the posture detection data (N1) corresponds to first data in the present invention.

The updating cycle (=reference cycle Δt1) of the first count value N1 is a duration longer than the time period (so-called latency) required for data communication (data communication through the transmission cable 34*a* or 34*b*) between the first processing unit 30 and the second processing unit 40.

The second processing unit 40 includes: a second counter 41, which sequentially updates and outputs a second count value N2 indicating the time in each predetermined cycle shorter than the reference cycle (more specifically, the second count value N2 indicating an elapsed time from an arbitrary initial time in each predetermined cycle); an interpolated count value generating unit 42, which generates an interpolated count value N3 indicating the time obtained by combining the time indicated by the first count value received from the first processing unit 30 with the time indicated by the second count value output from the second counter 42; a sensor posture estimating unit 43, which estimates the posture of the mounting portion (head 5) of the external sensor 50 of the robot 1 at the time corresponding to the interpolated count value N3; an external measurement data acquisition unit 44, which acquires the external measurement data from the external sensor 50; and a three-dimensional reconstruction unit 45, which performs processing of generating external recognition data indicating a relative arrangement state of an object detected by the external sensor 50 (an object measured in distance) to the robot 1, as functions implemented by one or both of the installed hardware configuration and program (software configuration).

The second counter 41 sequentially updates the second count value N2 in such a way as to increase the second count value N2 in a predetermined cycle Δt2 (constant cycle) defined by a clock signal generated by an oscillator or the like, not illustrated, which is included in the second processing unit 40. In this case, the above predetermined cycle Δt2, which is an updating cycle of the second count value N2, is a cycle sufficiently shorter than the reference cycle Δt1 (=an updating cycle of the first count value N1) (for example, a 1/1000 cycle of the reference cycle Δt1). Therefore, the second counter 41 is a high-speed counter that updates a count value at higher speed than the first counter 32.

Moreover, the second counter 41 sequentially receives an input of the first count value N1 received by the second processing unit 40 from the first processing unit 30. The second counter 41 then initializes the second count value N2, which is to be output, to an initial value (for example, zero) whenever the first count value N1 is input (whenever the first count value N1 is received).

Therefore, the second count value N2 output from the second counter 41 represents an elapsed time from the reception time of the first count value N1 (the elapsed time in each predetermined cycle Δt2 described above). In this case, the updating cycle of the second count value N2 (=Δt2: hereinafter, sometimes referred to as "fast cycle Δt2") is a cycle shorter than the reference cycle Δt1 (in this embodiment, for example, Δt2=Δt1/1000). Accordingly, the second count value N2 represents the time with a time resolution higher than that of the first count value N1.

Furthermore, the external measurement data acquisition unit 44 acquires an external measurement data obtained by the external sensor 50, for example, in a predetermined measurement processing cycle or at each measurement timing appropriately determined by the second processing unit 40. In this case, the external measurement data acquisition unit 44 outputs a start trigger signal for instructing the sensor control unit 51 to start measurement at the measurement timing for acquiring the external measurement data in this embodiment.

The start trigger signal is provided to the external sensor 50 via the sensor control unit 51, and in response thereto, the external sensor 50 starts the measurement. At this time, the external sensor 50 outputs the external measurement data, which is obtained by measuring the distances to a plurality of measurement points of objects present in front of the external sensor 50, to the second processing unit 40. The external measurement data then is acquired by the external measurement data acquisition unit 44.

On the other hand, upon the end of the measurement, the external sensor 50 outputs an end trigger signal indicating the fact of the end to the second processing unit 40 through the sensor control unit 51. The end trigger signal then is input to the interpolated count value generating unit 42 of the second processing unit 40.

The interpolated count value generating unit 42 receives an input of the end trigger signal from the sensor control unit 51 as described above and further sequentially receives inputs of the first count value N1 received by the second processing unit 40 from the first processing unit 30 and the second count value N2 output from the second counter 41.

Thereafter, the interpolated count value generating unit 42 determines and outputs an interpolated count value N3 representing the time when the end trigger signal is input from the sensor control unit 51. In other words, the interpolated count value N3 is associated with the external measurement data as an index value indicating the time when the external measurement data acquisition unit 44 acquired the external measurement data from the external sensor 50 and is determined as described below, for example.

Specifically, the interpolated count value generating unit 42 determines the interpolated count value N3 by combining (linear combination) the latest first count value N1 (hereinafter, referred to as "N1a"), which has been received from the first processing unit 30 before the time when the end trigger signal is input from the sensor control unit 51, with the second count value N2 (hereinafter, referred to as "N2a"), which has been output from the second counter 41 at the time when the end trigger signal is input, by using, for example, the following equation (1).

$$N3 = N1a + N2a/n \quad (1)$$

where $n = \Delta t1/\Delta t2$ (for example, n=1000)

For example, if N1a=50 and N2a=150, the interpolated count value N3 satisfies N3=50.150. In the case where the interpolated count value N3 is determined in this manner, the time obtained by multiplying the interpolated count value N3 by the reference cycle $\Delta t1$ ($=\Delta t1*N3=\Delta t1*N1a+\Delta t2*N2a$) represents the time when the external measurement data acquisition unit 44 acquired the external measurement data from the external sensor 50 (an elapsed time from the initial time) by using the same time resolution (the time resolution which is n times (1000 times in this embodiment) higher than the first count value N1) as the second count value N2.

The interpolated count value N3 may be a value obtained by multiplying the value calculated using the above equation (1) by an arbitrary constant (for example, n) other than zero. Moreover, the interpolated count value N3 may be a value ($=\Delta t1*N1a+\Delta t2*N2a$) representing the time itself when the external measurement data acquisition unit 44 acquired the external measurement data from the external sensor 50 (the elapsed time from the initial time).

Incidentally, if the second processing unit 40 cannot normally receive the first count value N1 from the first processing unit 30 due to a disconnection, a communication failure, or the like of the transmission cable 34b, the second count value N2 output from the second counter 41 cannot be initialized. Moreover, the first count value N1 used for generation of the interpolated count value N3 is not input to the interpolated count value generating unit 42.

If so, the interpolated count value generating unit 42 estimates the interpolated count value N3 by using only the second count value N2 output from the second counter 41.

Specifically, if the second count value N2 output from the second counter 41 exceeds a predetermined value N2x, which has been previously determined, the interpolated count value generating unit 42 detects an occurrence of an abnormal state where the second processing unit 40 cannot normally receive the first count value N1 from the first processing unit 30. The above predetermined value N2x is set to a value obtained by adding a predetermined margin α ($<\Delta t1/\Delta t2$) to an amount of change ($=\Delta t1/\Delta t2$) in the second count value N2, which corresponds to the reference cycle $\Delta t1$, for example.

In addition, when detecting the occurrence of the aforementioned abnormal state, the interpolated count value generating unit 42 determines the interpolated count value N3, which represents the time when the external measurement data is acquired (time associated with the acquired external measurement data), for example, by using the following equation (2), when an end trigger signal is input from the sensor control unit 51 thereafter.

$$N3 = N1b + \Delta N1 + (N2a - n*\Delta N1)/n \quad (2)$$

where

N1b: A first count value received last time by the second processing unit 40 before the occurrence of the abnormal state ΔN1: A quotient (integer value) obtained by dividing the second count value N2a at the current time by a ratio n ($=\Delta t1/\Delta t2$)

N2a−n*ΔN1: A remainder obtained by dividing the second count value N2a at the current time by the ratio n ($=\Delta t1/\Delta t2$)

In this case, when it is assumed that the state where the second processing unit 40 is able to normally receive the first count value N1 continues, "N1b+ΔN1" on the right-hand side of the equation (2) corresponds to an estimated value of the latest first count value N1a (the estimated value of the N1a on the right-hand side of the equation (1)) which must have been received by the second processing unit 40 before the time when the external measurement data is acquired. Moreover, (N2a−n*ΔN1) corresponds to an estimated value of the amount of change in the second count value N2 (an estimated value of N2a on the right-hand side of the equation (1)) after the time when the first count value N1a is received on the above assumption.

The determination of the interpolated count value N3 by the above equation (2) enables an appropriate determination of the interpolated count value N3 indicating the time when the external measurement data is acquired even after an occurrence of the abnormal state where the second processing unit 40 cannot normally receive the first count value N1.

The interpolated count value N3 determined by the interpolated count value generating unit 42 as described above is input to the sensor posture estimating unit 43 whenever the external measurement data acquisition unit 44 acquires the external measurement data. The sensor posture estimating unit 43 sequentially receives an input of posture detection data (N1), which has been transmitted from the first processing unit 30 and received by the second processing unit 40, in addition to the interpolated count value N3.

Thereafter, the sensor posture estimating unit 43 estimates posture detection data (N3), which represents the position and orientation of the mounting portion (head 5) of the external sensor 50 at the time indicated by the input interpolated count value N3 (the time when the external measurement data is acquired).

In this case, if the time indicated by the interpolated count value N3 coincides with the time indicated by a certain first count value N1c (in this embodiment, if "N3=N1c" is satisfied), the sensor posture estimating unit 43 determines the posture detection data (N1c), with which the first count value N1c is associated, as the posture detection data (N3) at the time indicated by the interpolated count value N3, out of the posture detection data (N1) received by the second processing unit 40.

Furthermore, if the time indicated by the interpolated count value N3 is between the time indicated by a certain first count value N1d and the time indicated by the subsequent first count value N1d+1 (In this embodiment, if "N1d<N3<N1d+1" is satisfied), the sensor posture estimating unit 43 estimates the posture detection data (N3) at the time indicated by the interpolated count value N3 by interpolation processing (for example, linear interpolation processing) from posture detection data (N1d), with which the first count value N1d is associated, and posture detection data (N1d+1), with which the subsequent second count value N1d+1 is associated. This enables the acquisition of the posture detection data at each acquisition time (time indicated by each interpolated count value N3) of the external measurement data.

Each of the posture detection data (N3) estimated as described above by the sensor posture estimating unit 43 and the external measurement data acquired by the external measurement data acquisition unit 44 is input to the three-dimensional reconstruction unit 45 in time series. Thereafter, the three-dimensional reconstruction unit 45 identifies an object arrangement state (a relative arrangement state of an object detected by the external sensor 50 to the robot 1) at the time indicated by the interpolated count value N3, from the external measurement data (N3) acquired at the time indicated by each interpolated count value N3 and from the estimated value of the posture detection data (N3) at the time indicated by the interpolated count value N3. The object arrangement state is represented by, for example, a three-dimensional point group viewed in the coordinate system set in the robot 1.

The external recognition data, which is data indicating the object arrangement state identified by the three-dimensional reconstruction unit 45 as described above, is transmitted from the second processing unit 40 to the first processing unit 30 or a higher-order control device or the like. In this embodiment, the external recognition data corresponds to third data in the present invention.

The above is the detail of the control processing device A of this embodiment. According to the control processing device A, the second processing unit 40 is able to obtain the time when the external measurement data is acquired with a high time resolution defined by the fast cycle Δt2 sufficiently shorter than the reference cycle Δt1 (an updating cycle of the first count value N1) related to the control processing by the first processing unit 30.

Moreover, the second processing unit 40 is able to estimate the posture detection data at the time when the external measurement data is acquired by interpolation processing from the time series of the posture detection data (N1) transmitted from the first processing unit 30.

Accordingly, the three-dimensional reconstruction unit 45 is able to generate external recognition data (data of a three-dimensional point group) indicating the relative arrangement states of surrounding objects to the robot 1 with accuracy. Consequently, when the motion control of the robot 1 is performed by using the external recognition data, a desired motion of the robot 1 is able to be determined with the actual arrangement states of the objects around the robot 1 appropriately reflected.

Moreover, even in the case of an occurrence of an abnormal state where the second processing unit 40 cannot normally receive the first count value N1 transmitted from the first processing unit 30 due to a disconnection or the like of the transmission cable 34b, the interpolated count value N3 indicating the time when the external measurement data is acquired is able to be estimated so that the temporal relationship with the posture detection data (N1) can be identified.

Specifically, as if the second processing unit 40 were continuously able to normally receive the first count value N1 transmitted from the first processing unit 30, the interpolated count value N3 indicating the time when the external measurement data is acquired is able to be determined.

Consequently, even in the case of an occurrence of an abnormal state where the second processing unit 40 cannot normally receive the first count value N1 transmitted from the first processing unit 30, the posture detection data at each acquisition time of the external detection data is able to be appropriately estimated so that the temporal consistency with the external measurement data can be appropriately established. This also enables an emergency stop or the like of the motion of the robot 1 to be appropriately performed.

The present invention is not limited to the above-described embodiments, but other embodiments may be employed. Other some embodiments will be described hereinbelow.

In this embodiment, the measurement by the external sensor 50 is performed according to the start trigger signal transmitted from the second processing unit 40 to the sensor control unit 51. The measurement by the external sensor 50, however, may be started periodically by the sensor control unit 51 or at an appropriately-determined timing, without a need for the transmission of the start trigger signal from the second processing unit 40 to the sensor control unit 51.

Moreover, while the legged mobile robot has been illustrated as a moving body to which the control processing device A is applied in this embodiment, the moving body may be, for example, a wheel-type moving body or the like. Furthermore, the control processing device according to the present invention is not limited to the moving body such as a robot or the like, but may be applied to various types of devices such as an industrial robot, transportation equipment, or the like. In this case, various types of data can be employed as first data generated or acquired by the first processing unit or as second data generated or acquired by the second processing unit for each device to which the control processing device according to the present invention is applied. The first data or second data is not limited to detection data, but may be a target value or the like.

Furthermore, while the communication between the first processing unit 30 and the second processing unit 40 is a wired communication in this embodiment, the communication may be a wireless communication.

Moreover, in this embodiment, the second count value N2 is initialized whenever the second processing unit 40 receives the first count value N1. The second count value N2, however, may be initialized for each period two or more times longer than the reference cycle. Considering a variation in the ratio n (=Δt1/Δt2) between the reference cycle Δt1 and the fast cycle Δt2, however, preferably the second count value N2 is initialized whenever the second processing unit 40 receives the first count value N1.

What is claimed is:

1. A control processing device comprising:
    a first processing unit having a first counter which outputs a first count value indicating time for each of predetermined reference cycles so as to sequentially update the first count value in each of the predetermined reference cycles and which has a function of performing processing of generating or acquiring first data, with which each first count value output from the first counter is associated, and processing of sequentially transmitting the first count value in each of the predetermined reference cycles; and
    a second processing unit which is configured to be able to receive the first count value transmitted from the first processing unit and has a second counter which outputs a second count value indicating time for each of predetermined cycles shorter than the predetermined reference cycles so as to sequentially update the second count value in each of the predetermined cycles, and which has a function of performing processing of regularly initializing the second count value output from the second counter in response to reception of the first count value and processing of generating or acquiring second data related to the first data with a time resolution higher than a time resolution defined by each of the predetermined reference cycles,
    wherein the second processing unit is configured to associate time obtained by combining time indicated by the first count value received from the first processing unit with time indicated by the second count value output from the second counter with the second data, when generating or acquiring the second data.

2. The control processing device according to claim 1, wherein the second processing unit is configured to associate with the second data, a time obtained by adding a duration, which is indicated by an amount of change in the second count value output from the second counter from the time indicated by the latest first count value to the time when the second data is generated or acquired, to the time indicated by the latest first count value received from the first processing unit before the time when the second data is generated or acquired, as the combined time.

3. The control processing device according to claim 1, wherein the second processing unit is configured to initialize the second count value output from the second counter for each reception of the first count value.

4. The control processing device according to claim 1, wherein:
the first processing unit is configured to sequentially perform processing of transmitting the first data, with which the first count value is associated, to the second processing unit in each of the predetermined reference cycles; and
the second processing unit further has a function of performing processing of estimating a value of the first data at the time associated with the second data, which has been generated or acquired, by interpolation processing from a time series of the first data received from the first processing unit.

5. The control processing device according to claim 4, wherein:
the first processing unit is configured to acquire detection data related to a motional state of a predetermined region of a moving body, as the first data, and to transmit the first data to the second processing unit; and
the second processing unit is configured to acquire the detection data of an object, which is present around the moving body, output from an external sensor mounted on the predetermined region of the moving body so as to detect the object, as the second data, and to generate third data indicating a relative arrangement state to the moving body of the object detected by the external sensor by using the value of the second data and a value estimated by the interpolation processing as the value of the first data at the time associated with the second data.

6. The control processing device according to claim 1, wherein, in a case of an occurrence of an abnormal state in which the first count value transmitted from the first processing unit cannot be normally received, the second processing unit is configured to estimate the time associated with the second data generated or acquired after the occurrence of the abnormal state, based on the second count value output from the second counter and to associate the estimated time with the second data.

7. The control processing device according to claim 6, wherein the second processing unit is configured to estimate a time obtained by adding a duration, which is indicated by an amount of change in the second count value output from the second counter from the time indicated by the first count value received last before the occurrence of the abnormal state until the time when the second data is generated or acquired after the occurrence of the abnormal state, to the time indicated by the first count value received last before the occurrence of the abnormal state, as the time associated with the second data.

\* \* \* \* \*